United States Patent
Clerc et al.

(10) Patent No.: US 9,579,926 B2
(45) Date of Patent: Feb. 28, 2017

(54) SPHERICAL WHEEL, AND VEHICLE IMPLEMENTING THE WHEEL

(71) Applicant: ALDEBARAN ROBOTICS, Paris (FR)

(72) Inventors: Vincent Clerc, Clamart (FR); Bruno Maisonnier, Paris (FR)

(73) Assignee: ALDEBARAN ROBOTICS, Paris (FR)

( * ) Notice: Subject to any disclaimer, the term of this patent is extended or adjusted under 35 U.S.C. 154(b) by 0 days.

(21) Appl. No.: 14/397,572

(22) PCT Filed: Apr. 30, 2013

(86) PCT No.: PCT/EP2013/058949
§ 371 (c)(1),
(2) Date: Oct. 28, 2014

(87) PCT Pub. No.: WO2013/164327
PCT Pub. Date: Nov. 7, 2013

(65) Prior Publication Data
US 2015/0129340 A1 May 14, 2015

(30) Foreign Application Priority Data
Apr. 30, 2012 (FR) ...................................... 12 53981

(51) Int. Cl.
*B60B 19/00* (2006.01)
*B60B 19/12* (2006.01)
(Continued)

(52) U.S. Cl.
CPC ............ *B60B 19/003* (2013.01); *B60B 19/12* (2013.01); *B60B 19/14* (2013.01); *B62D 61/06* (2013.01);
(Continued)

(58) Field of Classification Search
CPC ....... B60B 19/003; B60B 19/12; B60B 19/14; B62D 61/06
(Continued)

(56) References Cited

U.S. PATENT DOCUMENTS 2,448,222 A * 8/1948 Jones ...................... B60B 11/06
152/10
2,812,031 A * 11/1957 Aghnides ................ B60B 19/14
152/454

(Continued)

FOREIGN PATENT DOCUMENTS

CA 2294761 A1 * 1/1999 ............ B60B 19/00
CN 200951698 9/2007

(Continued)

OTHER PUBLICATIONS

Chinese Office Action dated Mar. 3, 2016 for application No. 2013800315043, with English translation.

*Primary Examiner* — Kip T Kotter
(74) *Attorney, Agent, or Firm* — Baker & Hostetler LLP

(57) ABSTRACT

A spherical wheel intended to move a vehicle and a vehicle implementing the wheel are provided, the wheel having its rotation motorized by a shaft able to rotate about an axis. The wheel (10) comprises two shells of which the surface follows the spherical surface of the wheel and each of which is bounded by a plane. The shells are each articulated by means of a pivot connection with respect to the shaft, an axis of each of the pivot connections being perpendicular to the plane of the relevant shell. The planes bounding the two shells are secant.

10 Claims, 8 Drawing Sheets

(51) Int. Cl.
  *B60B 19/14*     (2006.01)
  *B62D 61/06*     (2006.01)
  *B60B 33/00*     (2006.01)
(52) U.S. Cl.
  CPC ..... *B60B 33/0049* (2013.01); *B60B 2900/133* (2013.01); *B60B 2900/551* (2013.01); *B60Y 2200/80* (2013.01)
(58) Field of Classification Search
  USPC ...................................................... 301/5.23
  See application file for complete search history.

(56) References Cited

U.S. PATENT DOCUMENTS

| | | | |
|---|---|---|---|
| 4,785,899 A | | 11/1988 | Von Winckelmann |
| 2002/0185907 A1* | | 12/2002 | Zimet .................... A47L 9/009 |
| | | | 301/5.1 |

FOREIGN PATENT DOCUMENTS

| | | |
|---|---|---|
| CN | 101565062 | 10/2009 |
| CN | 201752996 | 3/2011 |
| JP | 2007210576 A | 8/2007 |
| WO | 2005028243 A1 | 3/2005 |

\* cited by examiner

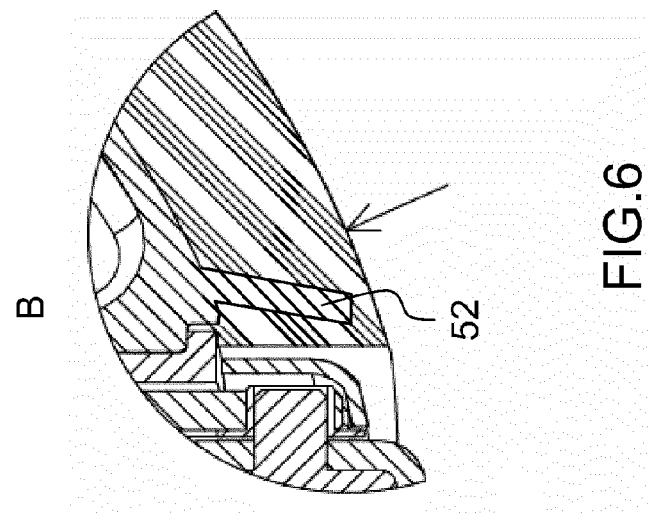
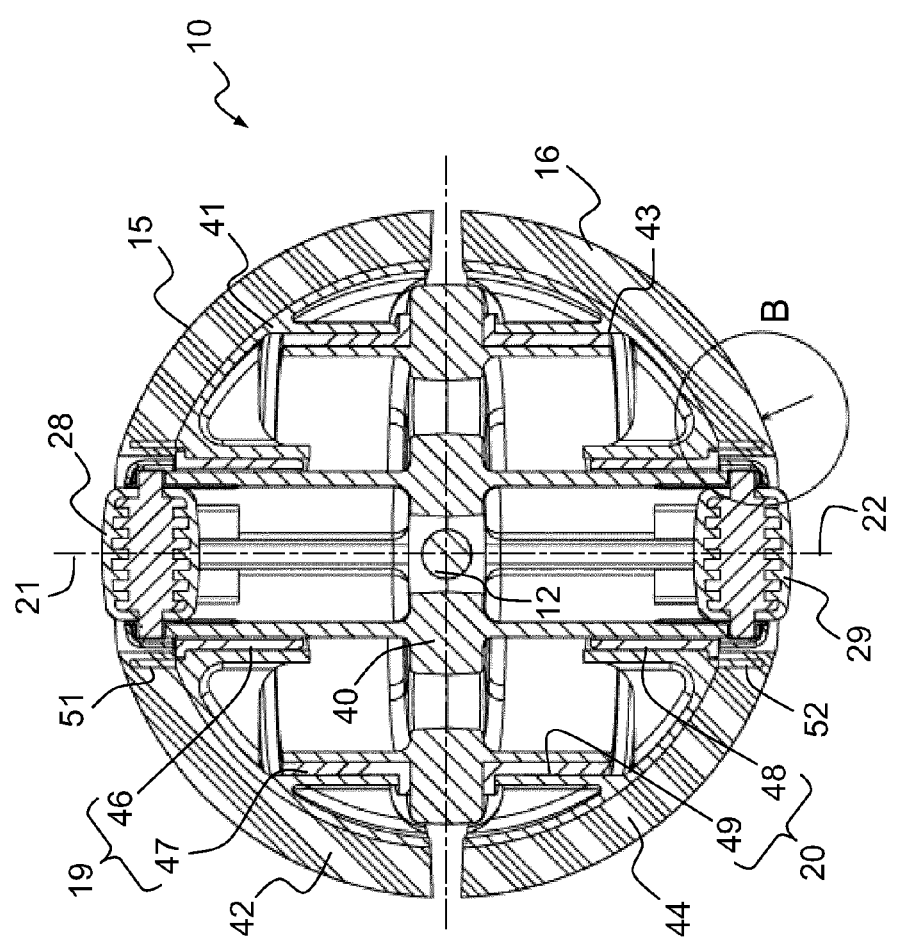

SPHERICAL WHEEL, AND VEHICLE IMPLEMENTING THE WHEEL

CROSS-REFERENCE TO RELATED APPLICATIONS

This application is a National Stage of International patent application PCT/EP2013/058949, filed on Apr. 30, 2013, which claims priority to foreign French patent application No. FR 1253981, filed on Apr. 30, 2012, the disclosures of which are incorporated by reference in their entirety.

FIELD OF THE INVENTION

The invention relates to a spherical wheel intended to move a vehicle and to a vehicle implementing the wheel.

In the conventional way, four-wheeled vehicles are equipped with directional wheels that allow them to change direction. The wheels are connected to the vehicle by means of pivot connections and, in the case of directional wheels, an additional degree of freedom in rotation is added. When the directional wheels are driven, universal joints allow the wheels to be driven while at the same time allowing the orientation of the axis of the pivot connection to be modified. This type of configuration does not allow small turn radii to be achieved. In other words, it is impossible to make the vehicle pivot on the spot with no speed.

Moreover, attempts have been made at creating a vehicle that has spherical wheels each capable of pivoting on itself. One example of such an embodiment is described in the patent application published under the number JP 2007-210576. That document describes a wheel comprising two hemispheres. The wheel is actuated by a horizontal driveshaft which drives the rotation of a support bearing the two hemispheres. The latter are each mounted on the support via a pivot connection. The two pivot connections are aligned. The axis they have in common is perpendicular to the axis of rotation of the driveshaft. A vehicle, such as a robot, can be equipped with four wheels as described in document JP 2007-210576. The axes of the driveshafts of four wheels are then arranged perpendicular to one another. The wheels are therefore aligned in pairs. Driving two wheels of a first pair allows the vehicle to be moved in a direction perpendicular to the axis this pair of wheels has in common. In the case of the second pair of wheels, the hemispheres rotate freely about their pivot connection. Moving the robot in a perpendicular direction is achieved by driving the wheels of the second pair. Combined movements are, of course, possible. This allows the vehicle to move in any direction whatever and even to spin.

BACKGROUND

This embodiment has a disadvantage. Specifically, the driveshaft of a wheel enters the wheel via an equatorial plane of the wheel, which plane is situated between the two hemispheres. The equatorial plane is defined by analogy with the Earth's sphere. This plane separates the two hemispheres which can be likened to the Earth's northern and southern hemispheres. The driveshaft has to have a certain rigidity which means that a minimum diameter is imposed thereon. The two hemispheres are therefore distant by at least this diameter. In practice though, a functional clearance needs to be added to the diameter of the shaft in order to prevent the hemispheres from rubbing against the driveshaft. This then yields two hemispheres each bounded by a plane. The planes of the two hemispheres are parallel and positioned a distance apart that cannot be reduced without the risk of impairing the rigidity of the driveshaft.

When the equatorial plane of the wheel is in a vertical position with respect to the ground, which is assumed to be horizontal, a discontinuity appears in the pressing of the wheel on the ground. More specifically, when the wheel is driven, the equatorial plane of the wheel with each wheel revolution comes into contact with the ground and causes the ground pressure to switch from one hemisphere to the other and therefore from a plane of one hemisphere to the other. Whenever this discontinuity is encountered, a loss of grip may occur, the spherical nature of the wheel is temporarily lost and, at high speed, a noise occurs with each discontinuity.

SUMMARY OF THE INVENTION

The invention seeks to provide a spherical wheel in which the disadvantages of the discontinuity are reduced. In other words, the invention seeks to allow the use of a driveshaft of greater diameter, without increasing the discontinuity.

To this end, one subject of the invention is a spherical wheel intended to move a vehicle, the wheel having its rotation motorized by a shaft able to rotate about an axis, characterized in that it comprises two shells of which the surface follows the spherical surface of the wheel and each of which is bounded by a plane, in that the shells are each articulated by means of a pivot connection with respect to the shaft, an axis of each of the pivot connections being perpendicular to the plane of the relevant shell, and in that the planes bounding the two shells are secant.

In other words, the axes of the two pivot connections are not aligned.

Another subject of the invention is a vehicle comprises at least three wheels according to the invention. The axes of the shafts of at least two wheels are not aligned.

BRIEF DESCRIPTION OF THE DRAWINGS

The invention will be better understood and other advantages will become apparent from reading the detailed description of an embodiment given by way of example, which description is illustrated by the attached drawing in which:

FIGS. 5 and 6 depict a first alternative form of embodiment of the wheel;

For the sake of clarity, the same elements will bear the same references in the various figures.

DETAILED DESCRIPTION

Figure 1:
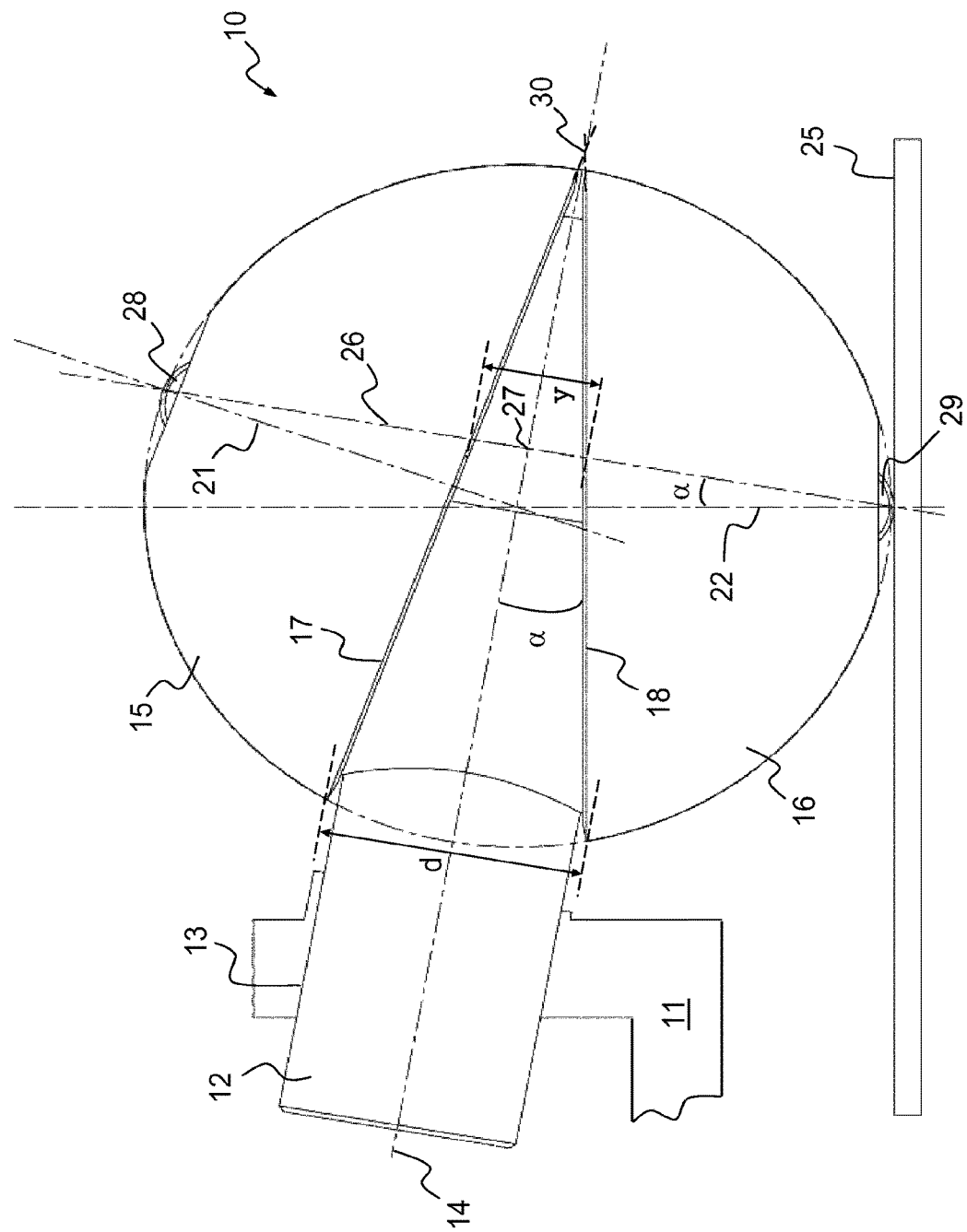
FIGS. 1 and 2 depict a spherical wheel implementing the principle of the invention.
Figure 2:
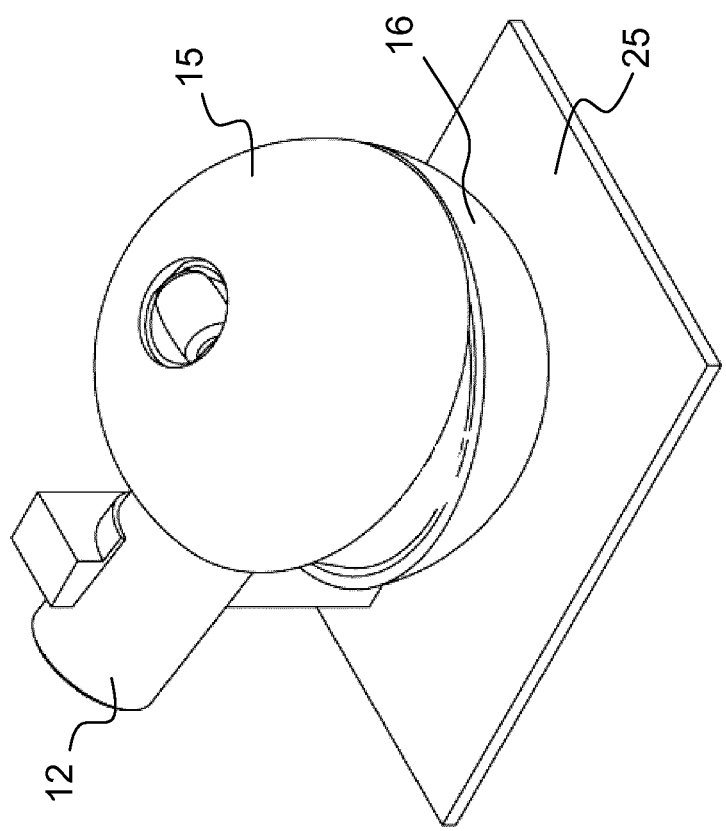

FIGS. 1 and 2 depict a spherical wheel 10 intended to move a vehicle 11. FIG. 1 is drawn in profile and FIG. 2 in perspective. The wheel 10 has its rotation motorized by a shaft 12. The vehicle 11 is depicted in the form of its body and the shaft 12 is connected to the body by a pivot connection 13. The axis of rotation of the shaft 12 bears the reference 14.

According to the invention, the wheel 10 comprises two shells 15 and 16 of which the surface follows the spherical surface of the wheel 10. The shell 15 is bounded by a plane 17 and the shell 16 is bounded by a plane 18. The shells 15 and 16 are each articulated by means of a pivot connection, 19 and 20 respectively with respect to the shaft 12. The axis 21 of the pivot connection 19 is perpendicular to the plane 17 of the shell 15 and the axis 22 of the pivot connection 20 is perpendicular to the plane 18 of the shell 16. The two pivot connections 19 and 20 are located inside their respective shell and will be detailed later on.

It is possible to produce shells 15 and 16 which are different, but advantageously they are identical and arranged symmetrically with respect to the shaft 12. In other words, the planes 17 and 18 are secant along a straight line that has a point of intersection 30 with the axis 14 of the shaft 12. In this configuration, the axes 21 and 22 of the two pivot connections 19 and 20 are secant and make a non-zero angle between them.

The wheel 10 is intended to run along the ground referenced 25 in FIGS. 1 and 2. One of the two shells 15 or 16 is in contact with the ground 25. When the shaft 12 drives the wheel 10 the wheel maintains contact with the ground 25 along a circle 26 of the spherical surface of the wheel 10. In this movement, the vehicle has a velocity vector perpendicular to the axis 14 at the point of intersection 27 between the axis 14 and a plane containing the circle 26. When the velocity vector of the vehicle 11, applied to the point 26, is not perpendicular to the axis 14, the shell that is in contact with the ground starts to turn freely about its pivot connection.

In other words, the shell in contact with the ground may have two movements imparted to it: a driving first rotation about the axis 14 and a second rotation about the axis of its pivot connection. The two rotations may of course combine depending on the direction of the velocity vector of the vehicle at the point 26.

In the operation of the wheel 10 a singularity appears when the shell in contact with the ground 25, the shell 16 in FIG. 1, has its plane 18 horizontal. In that configuration, if the vehicle has a vector applied at the point 27 that is not perpendicular to the axis 14, then the shell 16 cannot turn about its pivot connection 20 and slips along the ground 25. To prevent this slip, each shell 15 and 16 comprises a roller positioned in the continuation of the pivot connection of the relevant shell and allowing rolling at the spherical surface. More specifically, the shell 15 is equipped with a roller 28 and the shell 16 with a roller 29. The rollers 28 and 29 may have a single degree of freedom to rotate about an axis perpendicular to the axis 14. This rotational movement is enough to prevent the wheel from slipping in a singularity configuration. The rollers each have a line of rolling which follows the spherical surface of the wheel 10.

It is also possible to give each roller 28 and 29 two degrees of freedom to rotate about a point situated on the axis of the corresponding pivot connection. The roller still has a point of its running surface lying in the continuation of the relevant pivot connection and aligned with the spherical surface of the wheel 10. This roller, that can be likened to a free-turning ball in a housing, is easier to position than a roller that has one degree of freedom.

It was seen earlier that as the wheel 10 rotates, contact with the ground 25 is achieved on a point of the circle 26 of which the plane containing it is perpendicular to the axis 14.

Moreover, in the example in which the planes 17 and 18 are secant along a straight line that has a point of intersection 30 with the axis 14 of the shaft 12, it is possible to define a distance y between the planes 17 and 18 at the circle 26 and a distance d separating the planes 17 and 18 at the intersection of the planes 17 and 18 with the spherical surface, which intersection is the one furthest from the point 30. This distance d represents the largest possible diameter for the shaft 12. In practice, in order to avoid any rubbing between the shaft 12 and the shells 15 and 16, a functional clearance is provided between the shaft 12 and the shells 15 and 16. As a result, to simplify the explanation, the distance d will be likened to the diameter of the shaft 12. It will be observed that the fact of choosing a layout of the planes 17 and 18 so that they are secant means that for a given distance y the diameter d of the shaft 12 can be increased, this making it possible to increase the rigidity of the shaft or, alternatively, that for a given diameter d, the distance y that forms a discontinuity in the running of the wheel 10 is reduced. This is the same discontinuity as the one described in respect of the prior art.

Figure 3:
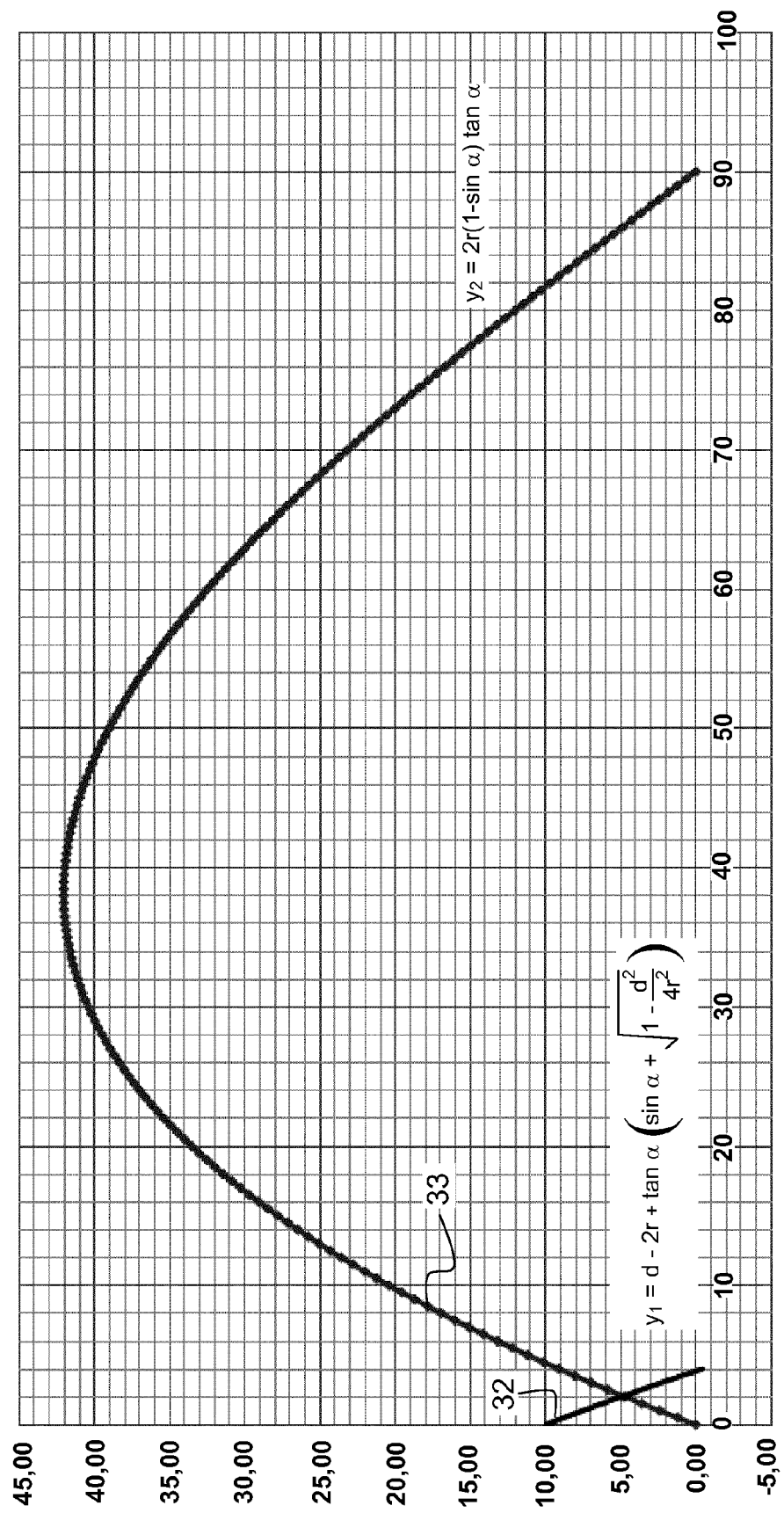
FIGS. 3 and 4 depict curves showing how an angle of opening of shells belonging to a wheel according to the invention is optimized.
Figure 4:
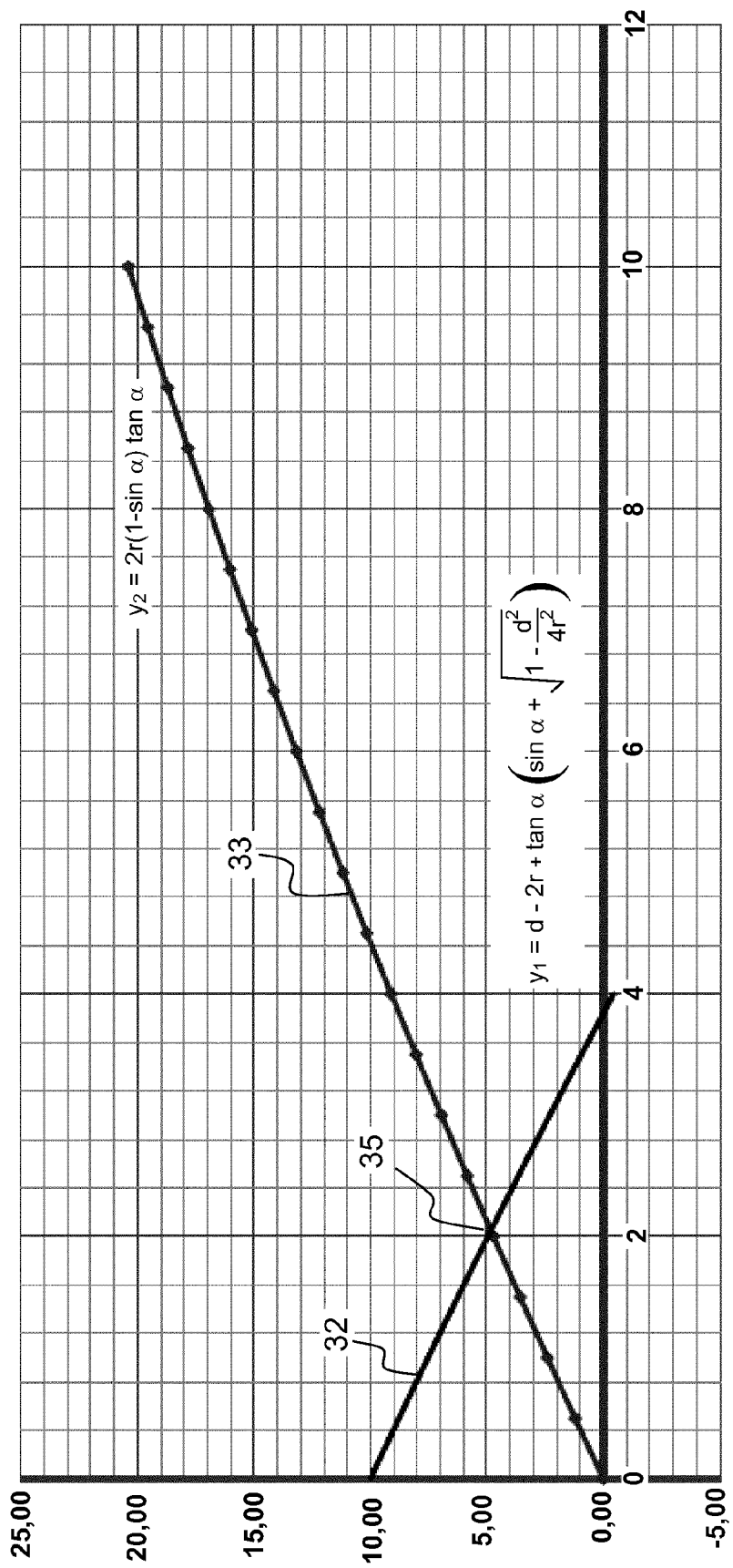

FIGS. 3 and 4 depict curves of the optimization of an angle formed between the two planes 17 and 18. An angle α of inclination of the axis 14 with respect to the ground 25 considered to be a horizontal surface is defined. This angle α is between the circle 26 and a radius of the sphere perpendicular to the plane of the ground 26, namely a radius that is vertical.

In the example depicted, it is assumed that the plane 18 can adopt a position parallel to the ground 25 which here is depicted as horizontal, as depicted in FIG. 1. Accordingly, the axis 22 of the pivot connection 20 belonging to the shell 16 is, in the configuration of FIG. 1, a vertical radius of the sphere. The angle of opening of the two planes 17 and 18 therefore has the value 2α. This assumption is not compulsory for implementing the invention. However, it does limit the slip at the singularity dealt with by the rollers.

The two curves give the value of the distance y. A first curve 32 shows how the distance, denoted $y_1$, evolves as a function of the position of the point of intersection 30. Parameters involved in this calculation are the angle α, the radius r of the sphere and the distance d. The curve starts for a point of intersection situated at infinity, namely according to the prior art.

The general equation gives:

$$y_1 = d - 2r + \tan\alpha \left( \sin\alpha + \sqrt{1 - \frac{d^2}{4r^2}} \right) \quad (1)$$

The following numerical values have been given: d=10 mm and r=70 mm. It is found that the distance $y_1$ decreases as the point of intersection 30 moves closer to the wheel 10.

A second curve 33 represents how the distance, denoted $y_2$, evolves as a function of the angle of opening of the two planes 17 and 18 when the point of intersection 30 is situated at the surface of the sphere.

The general equation gives:

$$y_2 = 2r(1 - \sin\alpha)\tan\alpha \quad (2)$$

The same numerical values: d=10 mm and r=70 mm are maintained. The two curves 32 and 33 are depicted in the same frame of reference. FIG. 2 shows the two curves 32 and 33 as a function of an angle α varying from 0 to 90°. Large-value angles α are only of little interest. This is because it seems difficult to motorize a vehicle when the axes 14 of its wheels are too steeply inclined. Essentially of interest are angle α values of less than 10°. This part of the curves 32 and 33 is depicted in an enlarged view in FIG. 4.

The two curves 32 and 33 have a point of intersection 35 which, for the numerical values chosen, gives an angle α of 2° and a y distance value of 4.84 mm. In practice, that part of first curve 32 that extends beyond the point of intersection 35 is unachievable because the point 30 would be situated inside the sphere. Likewise, that part of the second curve 33 lying before the point of intersection 35 is unachievable because the shells 15 and 16 would interfere with the shaft 12. Therefore, the best value is situated at the point of intersection 35. This value is theoretical. Functional clearances need to be provided both between the shells 15 and 16 near the point 30 and between the shells and the shaft 12 at the distance d.

FIG. 5 depicts an exemplary embodiment of the wheel 10 in broken section containing, on the one hand, in the case of the shell 15, the axis 21 of the pivot connection 19 and the axis of the roller 28 and, on the other hand, in the case of the shell 16, the axis 22 of the pivot connection 20 and the axis of the roller 29.

The wheel 10 comprises a support 40 secured to the shaft 12. The shell 15 comprises a rigid bearing structure 41 and a layer of soft material 42. Likewise, the shell 16 comprises a rigid bearing structure 43 and a layer of soft material 44. The layers of soft material 42 and 44 have properties chosen to allow grip on a ground 25 on which the intended to run. The layers 42 and 44 form the spherical surface of the shells 15 and 16. The layers 42 and 44 are, for example, made of rubber or of silicone.

The pivot connection 19 connects the support 40 and the rigid bearing structure 41. The pivot connection 20 connects the support 40 and the rigid bearing structure 43. In the example depicted, each of the pivot connections 19 and 20 is formed of two bearings: 46 and 47 for the connection 19 on the one hand, and 48 and 49 for the connection 20 on the other. It is of course possible to use a different number of bearings per shell according to the desired rigidity of the wheel 10. In this embodiment, the bearings are formed by means of a spacer piece interposed between the support 40 and the corresponding bearing structure. The spacer piece is, for example, made of a material that makes it possible to obtain a low coefficient of friction. Use may, for example, be made of polytetrafluoroethylene. Other embodiments of bearings are possible. For example, it is possible to use rolling bearings in order to limit the resistive torque in the rotation of the pivot connections 19 and 20.

For each shell 15 and 16, the corresponding layer of soft material is interrupted to allow the roller through. Advantageously, each shell comprises a containment ring configured to limit the creep of the layer in the region where it is interrupted. The layer of soft material is notably prone to creep with the pressure of the wheel 10 on the ground 25 as a result of the weight of the vehicle 11. Limiting creep around the roller makes it possible to reduce the dimensions of the interruption without risking rubbing between the roller and the layer of soft material. Such rubbing could prevent the shell from rotating about its pivot connection. The edge of the layer of soft material can thus be brought closer to the roller, thereby limiting the discontinuity in the pressing of the wheel 10 on the ground 25 where pressure switches between the layer of soft material and the roller.

In the case of the shell 15, the containment ring comprises for example a rib 51 made in the bearing structure 41 and surrounding the roller 28. Likewise, in the case of the shell 16, a rib 52 made in the bearing structure 43 surrounds the roller 29. FIG. 6 is an enlarged partial view of the wheel 10 in the region of the rib 52. The bearing structures 41 and 43 may be created by molding, the ribs 51 and 52 being molded with the bearing structures. The containment rings 51 and 52 may be of cylindrical shape about the axis of the respective pivot connection, as depicted in FIG. 5. However, advantageously, the containment rings 51 and 52 are of frustoconical shape about the axis of the respective pivot connection, the frustoconical shape tapering in the direction toward the spherical surface of the relevant shell, as depicted in FIG. 6. This makes it possible to reduce the dimensions of the interruption further, i.e. to limit still further the distance between the edge of the layer of soft material and the roller. The containment ring does not impede the mounting of the roller which can be performed from inside the shell.

Figure 8:
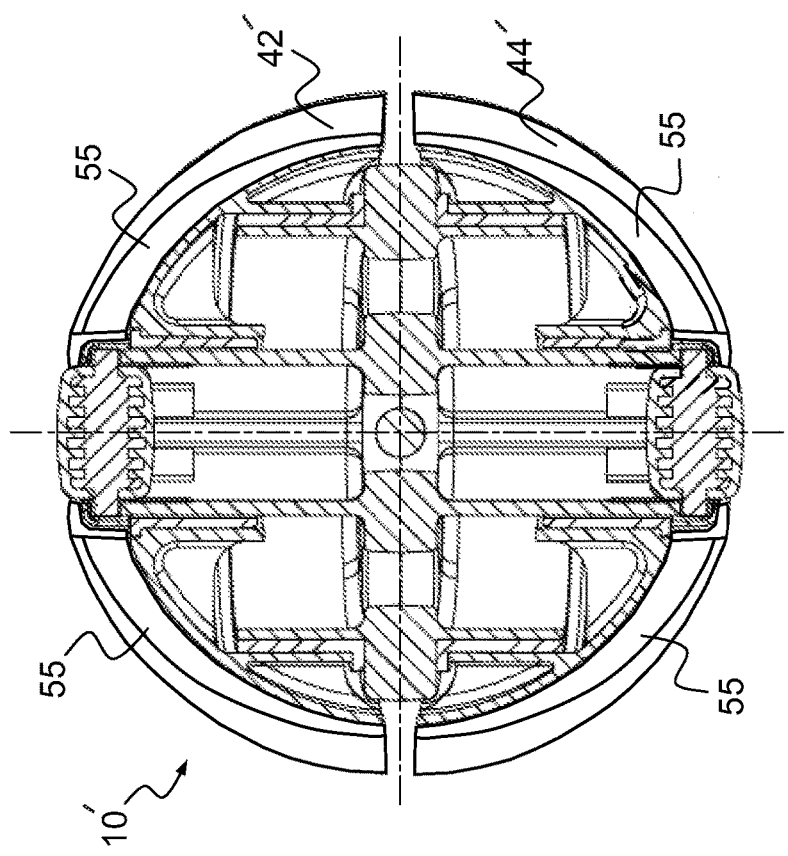
FIGS. 7 and 8 depict a second alternative form of embodiment of the wheel.
Figure 7:
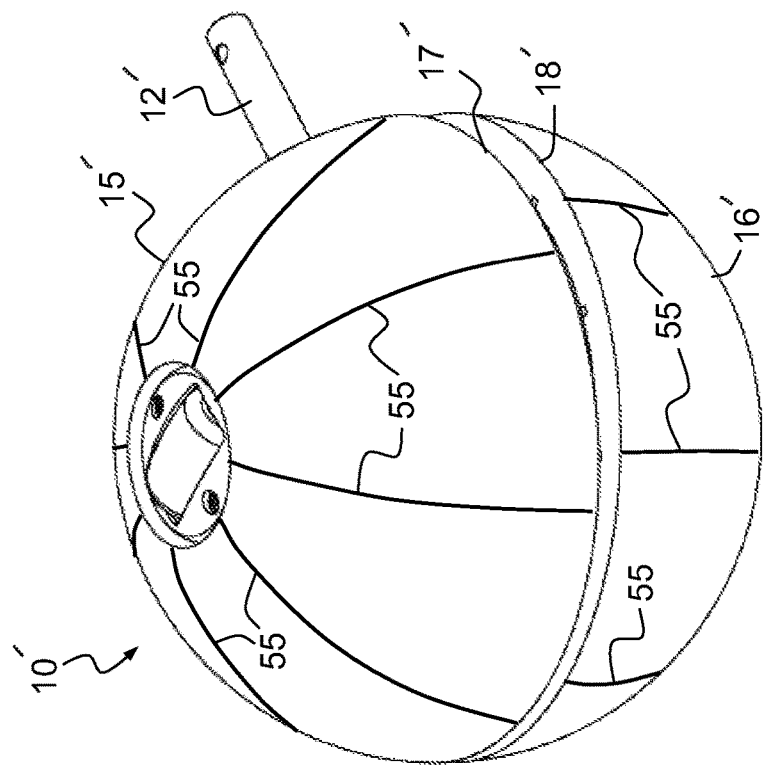

Advantageously, each shell 15 and 16 comprises one or more rigid ribs 55 arranged in the layer of soft material and configured to cause the flexibility of the layer to evolve as a function of a distance to the plane of the relevant shell, as shown in FIG. 7. The ribs 55 are advantageously produced in the bearing structure of the relevant shell. FIGS. 7 and 8 depict one example of the placement of the ribs 55. FIG. 7 depicts the wheel 10' in perspective and FIG. 8 depicts the wheel 10' in cross section in a similar way to FIG. 5. FIG. 7 depicts one exemplary distribution of the ribs 55 on each of the shells 15' and 16'. The ribs 55 are distributed in the manner of meridians on the Earth's surface, with the roller situated at the pole, the planes 17' and 18' representing parallels of the Earth's surface. In FIG. 7, eight ribs 55 have been arranged on each of the shells 15' and 16'. Other numbers of grooves are of course possible. In FIG. 8, the ribs 55 can be seen in profile. Near the roller, the ribs 55 have a height substantially equal to the thickness of the layer of soft material 42' or 44'. A slight overlapping of the rib 55 by the layer of soft material may be planned in order for the wheel 10' to maintain the same level of grip when contact with the ground is made via one rib or between two ribs 55. In the vicinity of the plane bounding the shell, plane 17' in the case of the shell 15' and plane 18' in the case of the shell 16', the ribs 55 have a height that is very small if not zero with respect to the thickness of the layer of soft material. This change in the height of the ribs 55 allows the flexibility of the layer of soft material to be adapted.

It is possible to produce a wheel 10 that has both the containment rings and the ribs 55.

Figure 10:
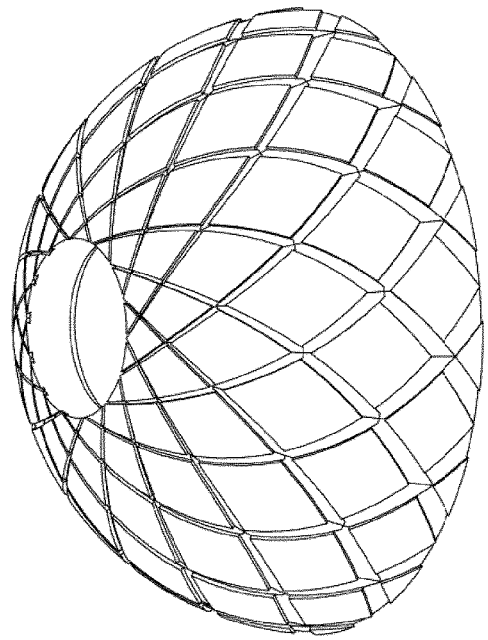
FIGS. 9, 10 and 11 depict several shapes of wheel surface.
Figure 11:
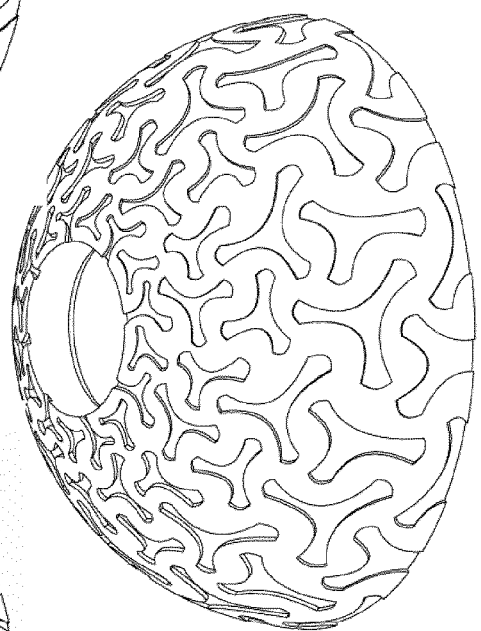
Figure 9:
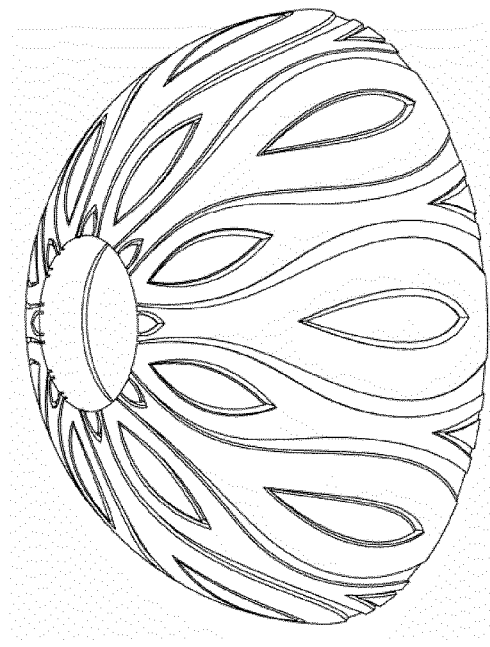

Advantageously, the layer of soft material is grooved in order to improve the grip of the wheel 10 on the ground 25. Various examples of groove layouts are depicted in FIGS. 9 to 11. These grooves allow a better purchase on various types of ground. The invention is advantageously implemented for a robot that can be used indoors. The grooves form tread patterns improving the multifunctionality of the robot for floor coverings of rug, marble, parquet, concrete, carpeted, etc. type. The grooves have sharp edges extending in all directions. Indeed, unlike known wheels which have just one pivot connection, a spherical wheel according to the invention can rotate with two degrees of freedom to rotate about the center of its spherical surface. It is therefore advantageous not to favor any particular direction in the design of the grooves.

Advantageously, a groove surface density increases with distance away from the plane 17 or 18 of the relevant shell 15 or 16. This increase in density is clearly visible in FIGS. 9 to 11. The grooves are more closely spaced near the interruption in the layer of soft material for the passage of the corresponding roller than they are near the plane 17 or 18. This arrangement makes it possible to improve the guarantee of a slip-free transition between the layer of soft material and the roller. This thus limits the risk of rubbing of the wheel between the layer of soft material and the ground in the vicinity of the transition. Such rubbing would not allow or would delay the passage from contact via the wheel onto one of the rollers thereof.

The grooves also allow the drainage of water when the wheel 10 is used on wet ground.

Figure 12:
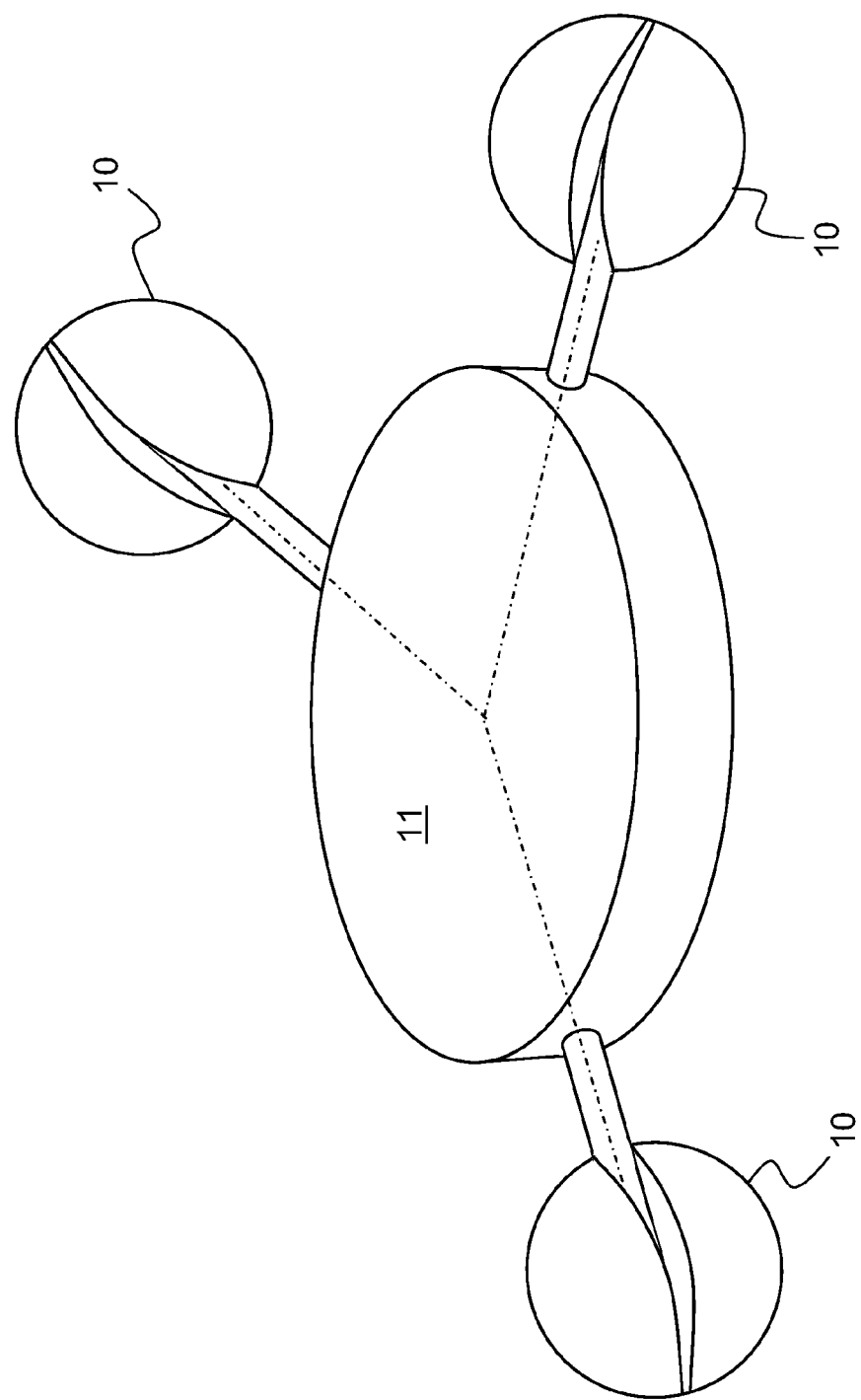
FIG. 12 depicts an example of a vehicle equipped with several wheels.

FIG. 12 depicts a vehicle 11 equipped with three wheels 10 according to the invention. This vehicle is, for example, a robot. The invention may also be implemented on vehicles comprising more than three wheels. For example, in the case of a four-wheeled vehicle, the axes of opposite wheels are situated in one and the same vertical plane with respect to a horizontal ground, thus forming two pairs of wheels. The planes containing the axes of the two pairs of wheels are perpendicular. In more general terms, the axes of the shafts of at least two wheels are not situated in one and the same plane, and this allows the vehicle to move in all directions, keeping its wheels 10 on the ground 25 through suitable control.

The invention claimed is:

1. A spherical wheel intended to move a vehicle, the wheel having its rotation motorized by a shaft able to rotate about an axis, comprising two shells of which a surface follows a spherical surface of the wheel and wherein each of the shells has an open end bounded by a respective plane, the shells being each articulated by means of a pivot connection with respect to the shaft, an axis of each of the pivot connections being perpendicular to the respective plane bounding each shell, and the respective planes bounding the two shells being secant.

2. The wheel as claimed in claim 1, the planes bounding the two shells being secant along a straight line that has a point of intersection with the axis of the shaft.

3. The wheel as claimed in claim 1, each shell comprising a roller positioned in a continuation of the pivot connection of each shell and allowing rolling at the spherical surface.

4. The wheel as claimed in claim 3, wherein in each shell, a layer of soft material is interrupted to allow the roller through, and wherein each shell comprises a containment ring configured to limit the creep of the layer of soft material in the region where it is interrupted in order to allow the roller through.

5. The wheel as claimed in claim 4, wherein the containment ring is of frustoconical shape about the axis of the corresponding pivot connection, the frustoconical shape tapering in the direction toward the spherical surface of the respective shell.

6. The wheel as claimed in claim 1, each shell comprising a rigid bearing structure and a layer of soft material the properties of which being chosen to allow grip on a ground on which the wheel is intended to run, the layer of soft material forming the spherical surface of each shell.

7. The wheel as claimed in claim 6, each shell comprising one or more rigid ribs arranged in the layer of soft material and configured to cause the flexibility of the layer of soft material to evolve as a function of a distance to the plane of the respective shell.

8. The wheel as claimed in claim 4, wherein the layer of soft material is grooved in order to improve the grip of the wheel.

9. The wheel as claimed in claim 8, wherein a groove surface density increases with distance away from the plane of the respective shell.

10. A vehicle, comprising at least three wheels as claimed in claim 1, and wherein the axes of the shafts of at least two wheels are not situated in one and the same plane.

\* \* \* \* \*

UNITED STATES PATENT AND TRADEMARK OFFICE
CERTIFICATE OF CORRECTION

PATENT NO. : 9,579,926 B2  
APPLICATION NO. : 14/397572  
DATED : February 28, 2017  
INVENTOR(S) : Vincent Clerc et al.

Page 1 of 1

It is certified that error appears in the above-identified patent and that said Letters Patent is hereby corrected as shown below:

In the Claims

In Line 1 of Claim 8, please replace "as claimed in claim 4" with --as claimed in claim 6--.

Signed and Sealed this
Twelfth Day of September, 2017

Joseph Matal
*Performing the Functions and Duties of the
Under Secretary of Commerce for Intellectual Property and
Director of the United States Patent and Trademark Office*